United States Patent
Gillett et al.

(10) Patent No.: US 10,154,452 B2
(45) Date of Patent: *Dec. 11, 2018

(54) DETERMINING SUITABILITY OF AN ACCESS NETWORK

(71) Applicant: Microsoft Technology Licensing, LLC, Redmond, WA (US)

(72) Inventors: Mark Alastair Gillett, London (GB); Soren Vang Andersen, Esch-sur-Alzette (LU); Christoffer Asgaard Rödbro, Stockholm (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/234,267

(22) Filed: Aug. 11, 2016

(65) Prior Publication Data

US 2016/0353369 A1  Dec. 1, 2016

Related U.S. Application Data

(63) Continuation of application No. 13/666,739, filed on Nov. 1, 2012, now Pat. No. 9,439,042.

(30) Foreign Application Priority Data

Jun. 29, 2012 (GB) .................................. 1211580.4

(51) Int. Cl.
*H04W 48/18* (2009.01)
*H04W 4/02* (2018.01)
(Continued)

(52) U.S. Cl.
CPC .......... *H04W 48/18* (2013.01); *H04W 4/021* (2013.01); *H04W 4/027* (2013.01); *H04W 4/50* (2018.02); *H04W 36/32* (2013.01)

(58) Field of Classification Search
CPC ... H04W 84/005; H04W 36/08; H04W 36/32; H04W 48/17; H04W 48/18; H04W 48/20;
(Continued)

(56) References Cited

U.S. PATENT DOCUMENTS 5,539,924 A   7/1996  Grube et al.
6,295,455 B1  9/2001  Fischer et al.
(Continued)

FOREIGN PATENT DOCUMENTS

CA   2533875       2/2014
CN   101420345 A   4/2009
(Continued)

OTHER PUBLICATIONS

"BPAI Decision", U.S. Appl. No. 11/313,048, Nov. 19, 2013, 11 pages.
(Continued)

*Primary Examiner* — Thai Vu
(74) *Attorney, Agent, or Firm* — Schwegman Lundberg & Woessner, P.A.

(57) ABSTRACT

A mobile terminal for use in a communication system comprising a first, packet-based network and a plurality of wireless access networks providing access to the first network. The mobile terminal comprises: one or more transceivers for connecting to the wireless access networks; and processing apparatus coupled to the one or more transceivers, operable to communicate with the first network by forming connections with the access networks using the one or more transceivers. The processing apparatus is configured to access a database recording motion information relating to motion of connection points of the wireless access networks; and the processing apparatus is further configured to determine one of the wireless access networks for use in accessing the first network, in dependence on the motion (Continued)

| Location At Which Encountered | Network ID | Tag(s) |
|---|---|---|
| [Latitude, longitude] | ID of WLAN network A | • Quality (fidelity, reliability)<br>• Motion (yes/no, velocity)<br>• Pricing info |
| [Latitude, longitude] | ID of WLAN network B | • Quality (fidelity, reliability)<br>• Motion (yes/no, velocity)<br>• Pricing info |
| [Latitude, longitude] | ID of WLAN network C | • Quality (fidelity, reliability)<br>• Motion (yes/no, velocity)<br>• Pricing info |
| ... | ... | • ... |
| [Latitude, longitude] | ID of WWAN network | • Quality (fidelity, reliability) |
| [Latitude, longitude] | ID of WWAN network | • Quality (fidelity, reliability) |
| ... | ... | • ... |
| [Latitude, longitude] | ID of satellite network | • Quality (fidelity, reliability) |
| ... | ... | • ... | information accessed from the database relating to one or more of the wireless access networks.

19 Claims, 6 Drawing Sheets

(51) Int. Cl.
  *H04W 4/50* (2018.01)
  *H04W 4/021* (2018.01)
  *H04W 36/32* (2009.01)

(58) Field of Classification Search
  CPC ..... H04W 4/001; H04W 4/021; H04W 4/027; H04W 64/003; H04W 64/006; H04W 4/50
  See application file for complete search history.

(56) References Cited

U.S. PATENT DOCUMENTS

| | | |
|---|---|---|
| 6,389,285 B1 | 5/2002 | Escamilla et al. |
| 6,433,735 B1 | 8/2002 | Bloebaum et al. |
| 6,625,457 B1 | 9/2003 | Raith |
| 6,748,439 B1 | 6/2004 | Monachello et al. |
| 6,763,226 B1 | 7/2004 | McZeal, Jr. |
| 6,829,481 B2 | 12/2004 | Souissi |
| 6,862,277 B2 | 3/2005 | Pan et al. |
| 6,925,378 B2 | 8/2005 | Tzamaloukas |
| 7,016,326 B2 | 3/2006 | Holeman et al. |
| 7,072,323 B2 | 7/2006 | Roberts et al. |
| 7,072,657 B2 | 7/2006 | Watanabe et al. |
| 7,197,569 B2 | 3/2007 | Dowling |
| 7,248,858 B2 | 7/2007 | Barber et al. |
| 7,251,488 B2 | 7/2007 | Chitrapu |
| 7,251,490 B2 | 7/2007 | Rimoni |
| 7,346,032 B2 | 3/2008 | Holeman et al. |
| 7,382,756 B2 | 6/2008 | Barber et al. |
| 7,385,947 B2 | 6/2008 | Wu et al. |
| 7,466,986 B2 | 12/2008 | Halcrow et al. |
| 7,499,705 B2 | 3/2009 | Rimomi et al. |
| 7,583,632 B2 | 9/2009 | Janevski et al. |
| 7,600,009 B2 | 10/2009 | Soininen et al. |
| 7,623,486 B2 | 11/2009 | Caldwell et al. |
| 7,646,710 B2 | 1/2010 | Christie, IV |
| 7,646,745 B2 | 1/2010 | Caldwell et al. |
| 7,706,796 B2 | 4/2010 | Rimoni et al. |
| 7,873,352 B2 | 1/2011 | Nguyen et al. |
| 7,912,978 B2 | 3/2011 | Swildens et al. |
| 7,937,043 B2 | 5/2011 | Wandel |
| 7,961,687 B2 | 6/2011 | Holeman et al. |
| 8,107,457 B2 | 1/2012 | White et al. |
| 8,107,954 B2 | 1/2012 | Islam et al. |
| 8,145,135 B2 | 3/2012 | Dalsgaard et al. |
| 8,270,948 B2 | 9/2012 | Oba et al. |
| 8,489,108 B2 | 7/2013 | Chan et al. |
| 8,638,760 B2 | 1/2014 | Jarzra et al. |
| 8,644,142 B2 | 2/2014 | Christie, IV |
| 8,666,399 B2 | 3/2014 | Kholaif et al. |
| 9,113,391 B2 | 8/2015 | Gillett et al. |
| 9,137,746 B2 | 9/2015 | Gillett et al. |
| 9,191,420 B2 | 11/2015 | Christie |
| 9,439,042 B2 | 9/2016 | Gillett et al. |
| 9,661,553 B2 | 5/2017 | Gillett et al. |
| 9,723,520 B1 | 8/2017 | Sylvain |
| 2002/0026527 A1 | 2/2002 | Das et al. |
| 2002/0087724 A1 | 7/2002 | Datta et al. |
| 2002/0143971 A1 | 10/2002 | Govindarajan et al. |
| 2002/0147008 A1 | 10/2002 | Kallio |
| 2003/0108006 A1 | 6/2003 | Holeman et al. |
| 2003/0108007 A1 | 6/2003 | Holeman et al. |
| 2003/0118015 A1 | 6/2003 | Gunnarsson et al. |
| 2003/0133425 A1 | 7/2003 | Radhakrishnan et al. |
| 2003/0172145 A1 | 9/2003 | Nguyen |
| 2003/0214958 A1 | 11/2003 | Madour et al. |
| 2003/0219022 A1 | 11/2003 | Dillon et al. |
| 2003/0227883 A1 | 12/2003 | Rimoni et al. |
| 2004/0018829 A1 | 1/2004 | Raman et al. |
| 2004/0023669 A1 | 2/2004 | Reddy |
| 2004/0073642 A1 | 4/2004 | Iyer |
| 2004/0081159 A1 | 4/2004 | Pan et al. |
| 2004/0203848 A1 | 10/2004 | Kumar |
| 2004/0205233 A1 | 10/2004 | Dunk |
| 2004/0218605 A1 | 11/2004 | Gustafsson et al. |
| 2005/0003835 A1 | 1/2005 | Riise et al. |
| 2005/0037758 A1 | 2/2005 | Rimoni |
| 2005/0048977 A1 | 3/2005 | Dorenbosch et al. |
| 2005/0197156 A1 | 9/2005 | Fourquin et al. |
| 2005/0239461 A1 | 10/2005 | Verma et al. |
| 2005/0245269 A1 | 11/2005 | Demirhan |
| 2005/0255856 A1 | 11/2005 | Griffin et al. |
| 2006/0019653 A1 | 1/2006 | Stamoulis et al. |
| 2006/0045056 A1 | 3/2006 | O'Hara, Jr. |
| 2006/0092890 A1* | 5/2006 | Gupta .................. H04W 48/18 370/338 |
| 2006/0126558 A1 | 6/2006 | Lee et al. |
| 2006/0135165 A1 | 6/2006 | Faccin |
| 2006/0221901 A1 | 10/2006 | Yaqub et al. |
| 2006/0232663 A1 | 10/2006 | Gandhi et al. |
| 2006/0245408 A1 | 11/2006 | Lee et al. |
| 2007/0008926 A1 | 1/2007 | Oba |
| 2007/0049274 A1 | 3/2007 | Yacobi et al. |
| 2007/0049276 A1 | 3/2007 | Rimoni et al. |
| 2007/0076662 A1 | 4/2007 | Jain et al. |
| 2007/0086378 A1 | 4/2007 | Matta et al. |
| 2007/0117572 A1 | 5/2007 | Adam et al. |
| 2007/0178933 A1 | 8/2007 | Nelson |
| 2007/0184835 A1 | 8/2007 | Bitran et al. |
| 2008/0031194 A1 | 2/2008 | Yaqub |
| 2008/0049702 A1 | 2/2008 | Meylan et al. |
| 2008/0112363 A1 | 5/2008 | Rahman et al. |
| 2008/0161001 A1 | 7/2008 | Holeman et al. |
| 2008/0170525 A1 | 7/2008 | Geiger |
| 2008/0274715 A1 | 11/2008 | Heit et al. |
| 2009/0005041 A1 | 1/2009 | Steinberg et al. |
| 2009/0058635 A1 | 3/2009 | LaLonde et al. |
| 2009/0063174 A1 | 3/2009 | Fricke |
| 2009/0124284 A1 | 5/2009 | Scherzer et al. |
| 2009/0131084 A1* | 5/2009 | Comstock ............ H04B 7/2606 455/458 |
| 2010/0034133 A1 | 2/2010 | Marom et al. |
| 2010/0103829 A1 | 4/2010 | Murzeau et al. |
| 2010/0144371 A1 | 6/2010 | Savoor |
| 2010/0172274 A1 | 7/2010 | Wu et al. |
| 2010/0254346 A1 | 10/2010 | Jain et al. |
| 2010/0291947 A1 | 11/2010 | Annamalai |
| 2011/0013569 A1 | 1/2011 | Scherzer et al. |
| 2011/0064058 A1 | 3/2011 | Rimoni et al. |
| 2011/0085447 A1 | 4/2011 | Kholaif et al. |
| 2011/0097278 A1 | 4/2011 | Verboom |
| 2011/0116479 A1 | 5/2011 | Jarzra et al. |
| 2011/0124334 A1 | 5/2011 | Brisebois et al. |
| 2011/0275378 A1* | 11/2011 | Kwon .................. H04W 36/30 455/437 |
| 2011/0300865 A1 | 12/2011 | Kashikar et al. |
| 2011/0310866 A1 | 12/2011 | Kennedy et al. |
| 2012/0020296 A1 | 1/2012 | Scherzer et al. |
| 2012/0058763 A1* | 3/2012 | Zhao .................... H04W 48/20 455/434 |
| 2012/0096520 A1 | 4/2012 | Dutta et al. |
| 2012/0150961 A1 | 6/2012 | Shatsky et al. |
| 2012/0170560 A1* | 7/2012 | Han ....................... G01S 5/0284 370/338 |
| 2012/0311016 A1 | 12/2012 | DeAnna et al. |
| 2013/0217414 A1 | 8/2013 | Nagaraj |
| 2013/0288673 A1* | 10/2013 | Le .......................... H04W 48/18 455/434 |
| 2013/0308470 A1 | 11/2013 | Bevan et al. |
| 2013/0310055 A1 | 11/2013 | Dewing et al. |
| 2014/0003261 A1 | 1/2014 | Gillett et al. |
| 2014/0003404 A1 | 1/2014 | Gillett et al. |
| 2014/0003405 A1 | 1/2014 | Gillett et al. |
| 2014/0004886 A1 | 1/2014 | Gillett et al. |

(56) References Cited

U.S. PATENT DOCUMENTS

| | | | |
|---|---|---|---|
| 2014/0040486 | A1 | 2/2014 | Christie |
| 2014/0242997 | A1 | 8/2014 | Golan |
| 2015/0334618 | A1 | 11/2015 | Gillett et al. |

FOREIGN PATENT DOCUMENTS

| | | | |
|---|---|---|---|
| CN | 101834888 | A | 9/2010 |
| CN | 101860872 | A | 10/2010 |
| CN | 102017781 | | 4/2011 |
| CN | 102598802 | | 7/2012 |
| EP | 0961512 | | 12/1999 |
| EP | 0967815 | | 12/1999 |
| EP | 1124396 | | 8/2001 |
| EP | 1924114 | | 5/2008 |
| EP | 2051458 | | 4/2009 |
| EP | 2112858 | | 10/2009 |
| EP | 2282587 | | 2/2011 |
| EP | 2418883 | | 2/2012 |
| EP | 2475219 | | 7/2012 |
| GB | 2481254 | | 12/2011 |
| JP | 2001245361 | A | 9/2001 |
| JP | 2002016542 | A | 1/2002 |
| JP | 2011097278 | A | 5/2011 |
| WO | WO-9817030 | | 4/1998 |
| WO | WO-0010306 | | 2/2000 |
| WO | WO-0028751 | | 5/2000 |
| WO | 0035233 | A1 | 6/2000 |
| WO | WO-2005011173 | | 2/2005 |
| WO | WO-2007000391 | | 1/2007 |
| WO | WO-2007103975 | | 9/2007 |
| WO | 2011085264 | A1 | 7/2011 |

OTHER PUBLICATIONS

"Corrected Notice of Allowance", U.S. Appl. No. 13/671,387, dated Aug. 12, 2015, 2 pages.
"Examiners Answers to Appeal Brief", U.S. Appl. No. 11/313,048, Sep. 29, 2010, 13 Pages.
"Final Office Action", U.S. Appl. No. 10/628,167, dated May 9, 2008, 11 pages.
"Final Office Action", U.S. Appl. No. 11/313,048, dated Aug. 4, 2015, 11 pages.
"Final Office Action", U.S. Appl. No. 11/313,048, dated Oct. 20, 2014, 12 pages.
"Final Office Action", U.S. Appl. No. 11/313,048, dated Nov. 5, 2009, 10 Pages.
"Final Office Action", U.S. Appl. No. 12/685,486, dated Nov. 5, 2012, 24 pages.
"Final Office Action", U.S. Appl. No. 13/666,739, dated May 20, 2015, 26 pages.
"Final Office Action", U.S. Appl. No. 13/668,116, dated Sep. 25, 2014, 10 pages.
"Final Office Action", U.S. Appl. No. 13/671,387, dated Dec. 19, 2014, 4 pages.
"Final Office Action", U.S. Appl. No. 13/781,706, dated Jul. 21, 2015, 20 pages.
"Final Office Action", U.S. Appl. No. 14/045,524, dated Mar. 19, 2015, 16 pages.
"Non Final Office Action", U.S. Appl. No. 11/313,048, dated Mar. 31, 2009, 9 Pages.
"Non-Final Office Action", U.S. Appl. No. 10/628,167, dated Jul. 6, 2007, 9 pages.
"Non-Final Office Action", U.S. Appl. No. 10/628,167, dated Nov. 17, 2008, 11 pages.
"Non-Final Office Action", U.S. Appl. No. 10/628,167, dated Dec. 26, 2007, 8 pages.
"Non Final Office Action", U.S. Appl. No. 11/313,048, dated Jan. 28, 2014, 11 pages.
"Non-Final Office Action", U.S. Appl. No. 11/313,048, dated Apr. 14, 2015, 13 pages.
"Non-Final Office Action", U.S. Appl. No. 13/666,719, dated Jun. 4, 2014, 60 pages.
"Non-Final Office Action", U.S. Appl. No. 13/666,739, dated Dec. 14, 2015, 31 pages.
"Non-Final Office Action", U.S. Appl. No. 13/666,739, dated Jun. 16, 2014, 28 pages.
"Non-Final Office Action", U.S. Appl. No. 13/668,116, dated Apr. 21, 2014, 12 pages.
"Non-Final Office Action", U.S. Appl. No. 13/671,387, dated Jul. 9, 2014, 25 pages.
"Non-Final Office Action", U.S. Appl. No. 13/781,706, dated Apr. 2, 2015, 17 pages.
"Non-Final Office Action", U.S. Appl. No. 14/045,524, dated Dec. 10, 2014, 13 pages.
"Non-Final Office Action", U.S. Appl. No. 14/799,404, dated Jul. 8, 2016, 17 pages.
"Notice of Allowance", U.S. Appl. No. 10/628,167, dated Aug. 28, 2009, 4 pages.
"Notice of Allowance", U.S. Appl. No. 12/685,486, dated Jun. 7, 2013, 10 pages.
"Notice of Allowance", U.S. Appl. No. 12/685,486, dated Sep. 25, 2013, 9 pages.
"Notice of Allowance", U.S. Appl. No. 13/666,739, dated Apr. 26, 2016, 10 pages.
"Notice of Allowance", U.S. Appl. No. 13/668,116, dated Mar. 20, 2015, 4 pages.
"Notice of Allowance", U.S. Appl. No. 13/671,387, dated Mar. 30, 2015, 15 pages.
"Notice of Allowance", U.S. Appl. No. 13/781,706, dated Oct. 26, 2015, 9 pages.
"Notice of Allowance", U.S. Appl. No. 14/045,524, dated Jul. 10, 2015, 7 pages.
"Supplemental Notice of Allowance", U.S. Appl. No. 13/668,116, dated Apr. 23, 2015, 2 pages.
"Supplemental Notice of Allowance", U.S. Appl. No. 13/668,116, dated Jul. 16, 2015, 2 pages.
"Supplemental Notice of Allowance", U.S. Appl. No. 14/045,524, dated Oct. 16, 2015, 2 pages.
"Final Office Action", U.S. Appl. No. 14/799,404, dated Nov. 25, 2016, 9 pages.
"Corrected Notice of Allowance", U.S. Appl. No. 13/666,739, dated Aug. 11, 2016, 2 pages.
"Final Office Action", U.S. Appl. No. 11/313,048, dated Aug. 16, 2016, 14 pages.
"Non-Final Office Action", U.S. Appl. No. 11/313,048, dated Feb. 12, 2016, 13 pages.
"Non-Final Office Action", U.S. Appl. No. 11/313,048, dated Oct. 18, 2016, 15 pages.
"Notice of Allowance", U.S. Appl. No. 11/313,048, dated Mar. 29, 2017, 9 pages.
"Foreign Office Action", CN Application No. 201380034544.3, dated Jul. 28, 2017, 13 pages.
"Foreign Notice of Allowance", CA Application No. 2,533,875, dated Oct. 11, 2013, 2 Pages.
"Foreign Office Action", CA Application No. 2,533,875, dated Feb. 27, 2012, 3 pages.
"Foreign Office Action", CA Application No. 2,533,875, dated May 13, 2013, 3 Pages.
"Foreign Office Action", CA Application No. 2,836,894, dated Mar. 26, 2015, 3 Pages.
"Foreign Office Action", CA Application No. 2,836,894, dated Sep. 22, 2014, 2 Pages.
"HF Transceiver CODAN NGT SRx", Retrieved From <http://hf-ssb-transceiver.at-communication.com/en/codan/hf_ssb_transceiver_ngtsrx.html> on Apr. 25, 2012, Apr. 1, 2010, 9 pages.
"International Search Report and Written Opinion", Application No. PCT/US2013/047736, dated Oct. 11, 2013, 10 pages.
"International Search Report and Written Opinion", Application No. PCT/US2014/018130, dated Jun. 2, 2014, 11 pages.
"International Search Report and Written Opinion", Application No. PCT/US2013/047734, dated Sep. 30, 2013, 12 pages.
"International Search Report and Written Opinion", Application No. PCT/US2013/047448, dated Sep. 23, 2013, 15 pages.

(56) References Cited

OTHER PUBLICATIONS

"International Search Report and Written Opinion", Application No. PCT/US2013/048009, dated Dec. 11, 2013, 9 pages.
"International Search Report", Application No. PCT/IB2004/002415, dated Jan. 25, 2005, 2 pages.
"Non-Final Office Action", U.S. Appl. No. 12/685,486, dated Jun. 7, 2012, 5 pages.
"Notice of Allowance", U.S. Appl. No. 14/799,404, dated Feb. 24, 2017, 8 pages.
"Supplemental Notice of Allowance", U.S. Appl. No. 14/799,404, dated Mar. 10, 2017, 2 pages.
"Supplemental Notice of Allowance", U.S. Appl. No. 14/799,404, dated Apr. 27, 2017, 2 pages.
"Supplementary European Search Report", EP Application No. 04769100.1, dated Oct. 7, 2011, 3 pages.
"Written Opinion", Application No. PCT/IB2004/002415, dated Feb. 2, 2005, 6 pages.
Akyildiz,"A Survey of Mobility Management in Next-Generation all-IP-based Wireless Systems", In IEEE Wireless Communications, vol. 11, Issue 4, Aug. 2004, pp. 16-28.
Chen,"Active Application Oriented Vertical Handoff in Next-Generation Wireless Networks", IEEE Communications Society, WCNC 2005, 2005, pp. 1383-1388.
Chew,"The Integration of Positioning Technologies for Precise Location Identification", Jan. 11, 2005, 138 pages.
Kim,"Improving Energy Efficiency of Wi-Fi Sensing on Smartphones", IEEE Infocom 2001, 2001, pp. 2930-2938.
McGuire,"Estimating Position of Mobile Terminals with Survey Data", in EURASIP Journal on Applied Signal Processing, vol. 1, Oct. 1, 2001, pp. 58-66.
Nicholson,"BreadCrumbs: Forecasting Mobile Connectivity", Proceedings of the 14th ACM international conference on Mobile computing and networking, 2008, 2008, pp. 41-57.
Sun,"Signal Processing Techniques in Network-aided Positioning", IEEE Signal Processing Magazine—Available at <http://www.cspl.umd.edu/sig/publications/sun_survey_200507.pdf>, Jul. 2005, pp. 12-23.
Zhao,"Handshake Time and Transmission Rate of 802.11g Measurement in Vehicular Networks", IEEE 35th Conference on Local Computer Networks (LCN), Oct. 10, 2010, pp. 730-736.
Zimmerman,"Database Correlation for Positioning of Mobile Terminals in Cellular Networks using Wave Propagation Models", In IEEE 60th Vehicular Technology Conference, vol. 7, Sep. 26, 2004, pp. 4682-4686.
"First Office Action and Search Report Issued in Chinese Patent Application No. 201380034549.6", dated Aug. 2, 2017, 11 Pages.
"Second Office Action Issued in Chinese Patent Application No. 201380034549.6", dated Apr. 13, 2018, 5 Pages.
"Office Action Issued in Japanese Patent Application No. 2015-520478", dated Aug. 1, 2017, 13 Pages.

\* cited by examiner

Figure 2

| Location At Which Encountered | Network ID | Tag(s) |
|---|---|---|
| [Latitude, longitude] | ID of WLAN network A | <ul><li>Quality (fidelity, reliability)</li><li>Motion (yes/no, velocity)</li><li>Pricing info</li></ul> |
| [Latitude, longitude] | ID of WLAN network B | <ul><li>Quality (fidelity, reliability)</li><li>Motion (yes/no, velocity)</li><li>Pricing info</li></ul> |
| [Latitude, longitude] | ID of WLAN network C | <ul><li>Quality (fidelity, reliability)</li><li>Motion (yes/no, velocity)</li><li>Pricing info</li></ul> |
| ... | ... | <ul><li>...</li></ul> |
| [Latitude, longitude] | ID of WWAN network | <ul><li>Quality (fidelity, reliability)</li></ul> |
| [Latitude, longitude] | ID of WWAN network | <ul><li>Quality (fidelity, reliability)</li></ul> |
| ... | ... | <ul><li>...</li></ul> |
| [Latitude, longitude] | ID of satellite network | <ul><li>Quality (fidelity, reliability)</li></ul> |
| ... | ... | <ul><li>...</li></ul> |

Figure 3

| Location | Connection Point | Tag(s) |
|---|---|---|
| [Latitude, longitude] [Radius] | WLAN AP #1 | • Quality (fidelity, reliability)<br>• Motion (yes/no, velocity)<br>• Pricing info |
| [Latitude, longitude] [Radius] | WLAN AP #2 | • Quality (fidelity, reliability)<br>• Motion (yes/no, velocity)<br>• Pricing info |
| [Latitude, longitude] [Radius] | WLAN AP #3 | • Quality (fidelity, reliability)<br>• Motion (yes/no, velocity)<br>• Pricing info |
| ... | ... | • ... |
| [Latitude, longitude] [Radius] | WWAN BS #1 | • Quality (fidelity, reliability) |
| [Latitude, longitude] [Radius] | WWAN BS #2 | • Quality (fidelity, reliability) |
| ... | ... | • ... |

Figure 4

| Regions Covered | Network ID | Tag(s) |
|---|---|---|
| [Definition of region] | ID of WLAN network A | • Quality (fidelity, reliability)<br>• Motion (yes/no, velocity)<br>• Pricing info |
| [Definition of region] | ID of WLAN network B | • Quality (fidelity, reliability)<br>• Motion (yes/no, velocity)<br>• Pricing info |
| [Definition of region] | ID of WLAN network C | • Quality (fidelity, reliability)<br>• Motion (yes/no, velocity)<br>• Pricing info |
| ... | ... | • ... |
| [Definition of region] | WWAN area X | • Quality (fidelity, reliability) |
| [Definition of region] | WWAN area Y | • Quality (fidelity, reliability) |
| ... | ... | • ... |

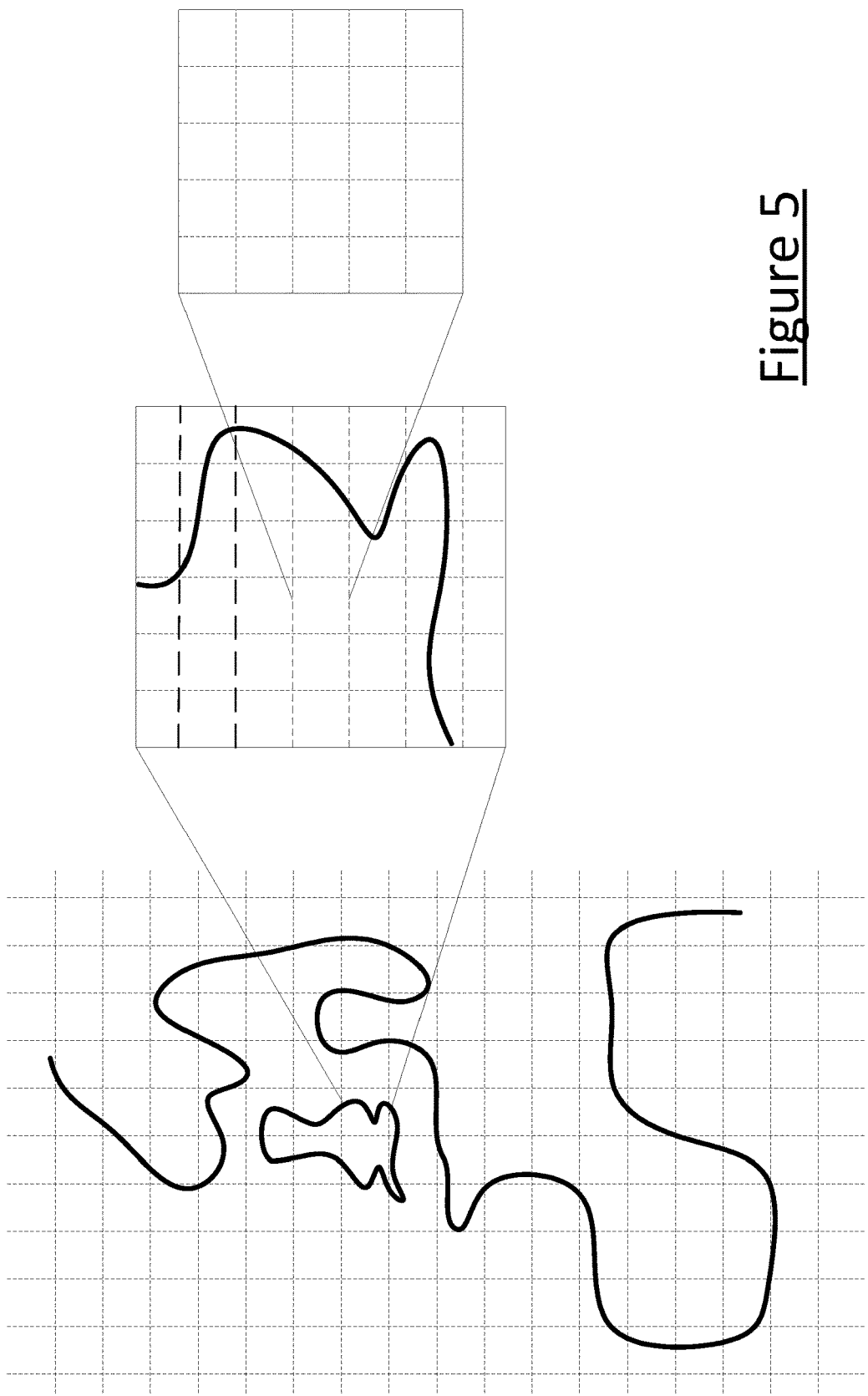

Figure 6

| Area / sub area | Networks available | |
|---|---|---|
| [unit sub-area 1] | ID of WLAN n/w A | • Tags |
| | ID of WLAN n/w B | • Tags |
| | ID of WWAN n/w X | • Tags |
| | ID of WWAN n/w Y | • Tags |
| [unit sub-area 2] | ID of WLAN n/w B | • Tags |
| | ID of WLAN n/w C | • Tags |
| | ID of WLAN n/w D | • Tags |
| | ID of WWAN n/w X | • Tags |
| | ID of WWAN n/w Y | • Tags |
| [unit sub-area 3] | ID of WLAN n/w A | • Tags |
| | ID of WLAN n/w C | • Tags |
| | ID of WWAN n/w X | • Tags |
| [unit sub-area 4] | ID of WWAN n/w X | • Tags |
| | ID of WWAN n/w Y | • Tags |
| | ID of Satellite n/w | • Tags |
| ... | ... | ... |

…

DETERMINING SUITABILITY OF AN ACCESS NETWORK

RELATED APPLICATION

This application is a continuation of U.S. patent application Ser. No. 13/666,739, filed Nov. 1, 2012, entitled "Determining Suitability of an Access Network", which claims priority under 35 USC 119 or 365 to Great Britain Application No. 1211580.04 filed Jun. 29, 2012, the disclosure of which is incorporated in its entirety.

FIELD OF THE INVENTION

The present invention relates to determining a network for use by a mobile terminal at different locations, e.g. so as to select between a WLAN and WWAN or to select between two or more WLANs as a means for accessing the internet in order to perform a VoIP call or other communication.

BACKGROUND

Some communication systems allow the user of a mobile terminal to conduct voice or video calls over a packet-based computer network, e.g. over an internetwork such as the Internet. Such communication systems include voice or video over internet protocol (VoIP) systems. These systems are beneficial to the user as they are often of significantly lower cost than conventional fixed-line or mobile networks, particularly for long-distance communication. Other types of communication media that can be implemented over a packet-based network include instant messaging ("IM"), SMS messaging, file transfer and/or voicemail.

When conducting communications such as VoIP calls over a first, packet-based network like the Internet, a mobile terminal typically connects to the Internet via a second, access network (which may also be packet-based in nature). If available, it is often possible to select between multiple different access networks. Typically a mobile terminal has two different types of connections available: Wireless Local Area Network (WLAN) and Wireless Wide Area Network (WWAN). Many WLANs typically use wi-fi, but other local, short-range wireless standards are also known in the art. The WWAN can be implemented by a number of different technologies such as GPRS, UMTS, HDPA, LTE, Wimax, etc. Usually, the type of WWAN available is decided by the operator, and as such the decision to make at the mobile terminal boils down to whether to use WLAN, WWAN, or both. On top of WLAN and WWAN, certain mobile terminals may have access to a satellite link as a third access technology, though this is usually a "last resort" if neither WLAN nor WWAN is accessible. In some systems it may also be possible to take into account a users' physical location in deciding whether to move to a network connection using a different wireless internet access technology.

To be able to choose which network to connect to, e.g. to select between WLAN or WWAN, or to select between two or more overlapping WLANs, the mobile terminal needs to know which networks are physically present and in operation. To do this the mobile terminal powers up its wireless interface or interfaces and listens for paging signals from the networks. So if a mobile terminal comprises a short-range, local transceiver for communicating with a local area wireless network such as a wi-fi network, this must be powered-up to listen for paging signals broadcast from any available WLANs; and if the mobile terminal comprises a longer-range transceiver for communicating with a wide area wireless network such as a 3G or LTE network, this must be power-up to listen for paging signals from the user's one or more WWAN providers. The interface is then powered down after a certain listening duration. This kind of process may be referred herein to as a scan. Conventionally such scans are performed periodically, e.g. every few seconds or minutes, so that the mobile terminal always knows roughly what networks are available.

In one existing system a location service server tells the mobile terminal which networks are believed to be available based on geographical location of the mobile in relation to known geographic information regarding network coverage.

SUMMARY

According to embodiments of the present invention there is provided a mobile terminal for use in a communication system comprising a first, packet-based network and a plurality of wireless access networks providing access to the first network. The mobile terminal comprises: one or more transceivers for connecting to the wireless access networks; and processing apparatus coupled to the one or more transceivers, and operable to communicate with the first network by forming connections with the access networks using the one or more transceivers. The processing apparatus is configured to access a database recording motion information relating to motion of connection points of the wireless access networks. The processing apparatus is further configured to determine one of the wireless access networks for use in accessing the first network, in dependence on the motion information accessed from said database relating to one or more of the wireless access networks.

According to further embodiments of the present invention, there is a provided a corresponding method and computer program product.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the noted disadvantages.

BRIEF DESCRIPTION OF THE DRAWINGS

For a better understanding of the present invention and to show how it may be put into effect, reference is made by way of example to the accompanying drawings in which:

FIG. 2 is a schematic representation of a localization database,

FIG. 3 is a schematic representation of another localization database,

FIG. 4 is a schematic representation of another localization database,

FIG. 5 is a schematic representation of a cell-like localization scheme, and

FIG. 6 is a schematic representation of another localization database.

DETAILED DESCRIPTION OF PREFERRED EMBODIMENTS

Figure 1:
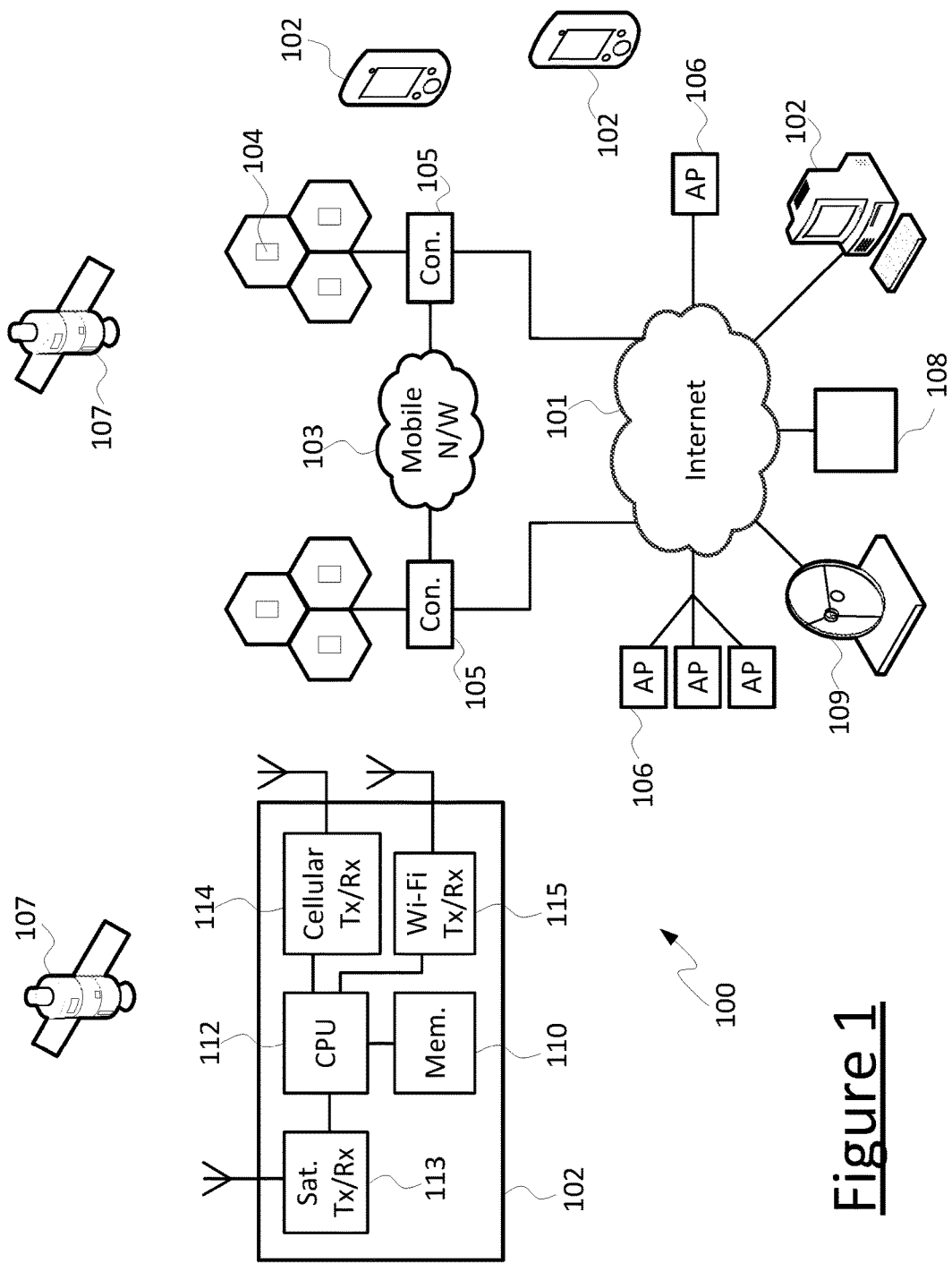
FIG. 1 is a schematic representation of a communication system.

As mentioned, a mobile terminal performs a scan by powering up its wireless interface or interfaces and listening for paging signals from potential networks in order to determine which networks are present. The mobile terminal can thereby choose which network to connect to (e.g. to select between WLAN or WWAN, or between two or more overlapping WLANs). One issue is that the scanning consumes a certain amount of power due to the need to regularly power-up the relevant interface, and therefore the process can affect the battery life of the mobile terminal.

In one existing system a location service server tells the mobile terminal which networks are believed to be available based on geographical location of the mobile in relation to known geographic information regarding network coverage. However, the geographical coverage of a network is not necessarily the only or most relevant factor. It would therefore be desirable to find an improved way of determining when useful networks are likely to be available.

The present invention provides a mobile terminal for use in a communication system comprising a first, packet-based network and a plurality of wireless access networks providing access to the first network. The mobile terminal comprises one or more transceivers for connecting to the wireless access networks, and processing apparatus coupled to the one or more transceivers, operable to communicate with the first network by forming connections with the access networks using the one or more transceivers. The processing apparatus is configured to access a database recording motion information relating to motion of connection points of the wireless access networks. The processing apparatus is further configured to determine one of the wireless access networks for use in accessing the first network, in dependence on the motion information accessed from the database relating to one or more of the wireless access networks.

Motion information may also be relevant to the suitability of an access network. For example, certain WLAN access points are physically moving, e.g. access points installed on-board cars or trains. A moving user may well have reason to connect to such a moving access point, whereas a stationary user would not want to connect to a bypassing car or train, etc.

In embodiments, the database may record whether an access point is moving or stationary. In other embodiments, if a velocity estimate (speed and direction) is available, it may be possible to predict which network will become available and which will be disconnected in the near future. For example, in one direction the best decision may be to handoff from a WLAN to a WWAN, while in another direction the best decision is to handoff from a current WLAN directly to a neighbouring WLAN.

In embodiments, the processing apparatus may be configured to automatically select which of a plurality of available ones of said wireless access networks to use to connect to the first network in dependence on the motion information accessed from said database relating to one or more of the wireless access networks.

In further embodiments, the processing apparatus may be configured to determine motion information relating to a connection point as experienced by the mobile terminal, and to thereby dynamically record the determined motion information in the database.

Thus in embodiments, the present invention may enable one or more user terminals to dynamically contribute to a database based on their actual experience. Because the motion information is contributed by the mobile terminal based on its own experience, this is advantageously achieved without the need for the database to be maintained solely by a central operator.

In further preferred embodiments, the processing apparatus may be configured such that said determination of one of the access networks comprises: controlling activation of one or more of the transceivers to scan for availability of one or more of the access networks in dependence on the motion information accessed from said database relating to one or more of the wireless access networks.

Thus the invention advantageously reduces the need to scan when useful new networks are unlikely to be available.

The below-described embodiments of the invention revolve around improving the experience of a VoIP user by means of geographical localization data. In the preferred embodiments such information is used to enable selection of the best network to connect to in a given scenario. The idea is to take into account a users' physical location in deciding whether to move or attempt to move a network connection to a different wireless internet access technology.

As the mobile terminal moves to a new position, it performs a table look-up to see whether a network access point is available. In certain embodiments the table can be stored locally, with updates being pushed now and then. If an access point is nearby, a scan is triggered or the frequency of scans is increased. This is advantageous over constant scanning which costs battery.

The method is further augmented according to one or more of the following scenarios. In the following it is assumed that the user's position is known for example through GPS or other alternative positioning techniques that will be discussed later.

A first scenario comprises a handover to a dynamically tagged access point, based on storing and utilizing a history of different networks' quality indexed by localization. At the mobile, a table of data is stored comprising entries like {position, network, quality, time-of-day}. The quality parameter may comprise a measure of fidelity, such as signal strength or uplink and/or downlink bandwidth experienced on the network. The table is updated when a call or similar is carried out. When moving to a new position, the mobile terminal performs a look-up in this table to see whether there should be a better network available at the current position. If so, it triggers a scan, or increases the frequency of scans, and makes the handover if possible. This will save battery, and moreover void handovers to networks that performed poorly in the past.

A second scenario comprises a handover to a global dynamically tagged access point, based on dynamically updating and consulting a centralized table of network qualities indexed by localization. As a variant of the above, the table could be kept at a server. All users then update the table when trying out new networks and a user moving to a new position performs the look-up in the table on the server instead of locally. This has advantages over the locally tagged version as users learn from each other, although it comes at the cost of increased radio access.

A third scenario comprises tagging networks with reliability parameters. The "quality" entry of a tagged network may alternatively or additionally contain parameters describing reliability, for example, the average duration of uninterrupted service.

In a particularly preferred embodiment, quality is an aggregation of latency, bandwidth, reliability, loss and jitter. Alternatively the quality may comprise any or all of these properties.

A fourth example comprises tagging networks with movement data, e.g. as being stationary or not. Stationary networks may be preferred when user is stationary and vice versa. Certain WLAN access points (APs) are physically moving. For example, this is true for on-board car or train WLANs. This could be detected and stored in the dynamic tagging database. A moving user would probably want to connect to such a moving access point, whereas a stationary user would not want to connect to, for example, an access point that is just passing by.

If a velocity estimate (speed and direction) is available, it is also possible to predict which network will become available and which will be disconnected in the near future. This can be exploited. For example: in one direction of motion the best decision will be to handoff from WLAN to WWAN, while in another direction of motion the best decision will be to handoff from current WLAN directly to the neighbour WLAN so as to avoid superfluous WLAN to WWAN to WLAN handover cycle.

A fifth scenario comprises rating providers as part of a virtual market-place, presenting to a user a list of available networks along with their quality as experienced by other users, or alternatively selecting a network for the user based on pricing information, quality, user needs and/or activity. As an extension to the globally tagged access points, or an alternative, the user may be presented with his current connection options along with quality indicators and also pricing information to help him select an appropriate one. Alternatively, the mobile terminal may make the decision for the user automatically based on pricing info and what he is doing (e.g. audio or video call), and on a selection policy which can be either a default one or one defined or selected by the user.

A sixth scenario involves reducing network scanning frequency when not moving. When staying in the same position for a long time the frequency of WLAN scanning can be reduced as the chance of (a better) one suddenly becoming available is small. This saves battery. Further, instead of consulting the GPS which is costly battery wise, lack of movement could be detected via an accelerometer.

This idea can be extended to reduce network scanning frequency when moving fast.

Under certain conditions, for example when driving a car, constant scanning for WLANs is pointless and a waste of battery; WWAN is a better choice of connection. Such scenarios could be detected by considering the velocity data that are already present in typical GPS processing algorithms Similarly, when already connected to a WLAN and moving at the same time (for example on a train or airplane) the frequency of WLAN scans can be reduced as the chance of one becoming available is very slim. Also, if the speed of travel is high it indicates we should not handover to WWAN as that will lead to frequent cell handovers.

Hence network scanning frequency can be set in dependence of speed of movement. Preferably scanning is disabled when speed is too high.

In embodiments, a particularly preferred behavior with which a mobile terminal may be configured is to detect when the terminal is first moving and then subsequently stops. This may be taken to indicate arrival at a new position. Here it is particularly advantageous to scan for new networks. Therefore the mobile terminal may advantageously be configured with a rule along the lines "trigger scan if not moving after scans have been suspended due to motion".

The above scenarios fall into two categories: firstly, localization assisted network handovers by dynamic tagging, and secondly adaptation of network scanning to user movement.

Some examples of localization technologies that can be used to implement the present invention are now discussed.

A first example is GPS. There are various ways to obtain the above-mentioned localization data, such as GPS (the term GPS may be used herein for all similar services, that is, it includes GLONASS and Galileo). Using such a system readily provides geocentric coordinates, velocity, and their associated uncertainties as long as the mobile terminal has a clear view to the sky. If accelerometer data is available, it can be incorporated as an acceleration observation, e.g. which fits into a Kalman filtering framework.

One problem with using GPS though is that it is quite battery hungry, but some of the scenarios above do not need continual position monitoring, i.e. the GPS could be turned on only when needed. In older systems, this might not have been a desirable option because obtaining the position from cold start could take up to 12 minutes (broadcast cycle for almanac and ephemeris). However this problem has been relieved by assisted GPS (A-GPS) where information is received via a data network.

Another option for obtaining geocentric-type coordinates is to observe which network cells are available, based on cell ID. Combining this with a database will provide a rough location estimate. Such can be refined by also taking into account signal strength. There are well-known trilateration methods for this. As compared to GPS such an approach is much less battery hungry and it works indoors. On the downside, it is not as precise, and it works only in areas that have cell coverage. Obtaining velocity estimates should be possible just as for GPS, though they will be less precise.

Another option is to use an ID of a nearby wi-fi access point or network. WLAN networks have small coverage and therefore simply observing a nearby wi-fi access point is a good location indicator. If the position of the wi-fi access point is known, this location can be directly mapped to coordinate data. Over time, a database of wi-fi access point locations can be built when they are observed and the mobile terminal's location is known (for example, if GPS is running)

In some implementations of the above scenarios however, there may be little need to map wi-fi IDs to geographical positions. Instead, an alternative is to use the wi-fi ID for table lookup directly.

While this method cannot provide any meaningful velocity vectors, the speed of movement can be assessed qualitatively by monitoring the rate of change of available wi-fi IDs.

Aggregated localization techniques may also be used, i.e. combining different localization techniques. For example the Skyhook and Place Lab systems make use of GPS, cell and wi-fi ID.

Some exemplary embodiments of the present invention are now discussed in more detail in relation to FIG. 1.

FIG. 1 is a schematic illustration of a communication system 100 comprising a plurality of communication networks. The plurality of networks comprises a first, packet-switched network 101; preferably a predominantly-wired, wide area internetwork such as the Internet. Connected to the first network 101, the plurality of networks further comprises at least one wireless wide area network (WWAN) and a plurality of wireless local area networks (WLANs).

The at least one WWAN preferably comprises a mobile cellular network 103. The mobile cellular network 103 comprises a plurality of base stations 104 (sometimes referred to as node Bs in 3GPP terminology) operating according to a longer range wireless access technology. Each base station 104 is arranged to serve a corresponding cell of the cellular network 103.

Each of the WLANs comprises one or more local, short-range wireless access points 106 such as wi-fi access points operating according to a shorter range wireless access technology. In some cases, a WLAN may be formed of only a single access point 106 (and whatever mobile user terminals are connected to it at the time).

WLAN and WWAN are terms that will be familiar to a person skilled in the art. A wireless local area connection uses a different kind of radio technology than a wireless wide area connection.

In most territories, local area wireless technologies are configured to operate on unlicensed frequency bands whereas wide area wireless technologies are configured to operate on licensed frequency bands.

Further, local area technologies are designed to form short-range connections over a range of the order of tens of meters, e.g. each access point covering a radius smaller than about 100 m or 200 m. For example a WLAN is typically arranged to cover a region corresponding to the size of a room, building, office, shop, cafe or such like. Wide area technologies on the other hand are designed to form connections over a range of the order of hundreds of meters or kilometers, e.g. each base station covering a cell of radius greater than 200 m, 500 m or 1 km. For example a cell is typically arranged to cover a region corresponding to the size of several streets or a village, and the network itself is arranged to cover a region corresponding to the size of a town, city, county, state or country or even crossing boundaries between countries.

Examples of WWANs include LTE (Long Term Evolution), W-CDMA (Wideband Code Division Multiple Access), GSM (Global System for Mobile Communications), UMTS (Universal Mobile Telecommunications System), UTRAN (Universal Terrestrial Radio Access Network), HSPA (High Speed Packet Access), CDMA2000 or other 3GPP (3rd Generation Partnership Project) networks; WiMAX networks, CDPD (Cellular Digital Packet Data) networks and Mobitex networks. Other WWAN technologies may be familiar to a person skilled in the art.

Examples of WLANs include wi-fi networks, a HiperLAN networks, HomeRF networks, OpenAir networks and Bluetooth networks. Other WLAN technologies may be familiar to a person skilled in the art.

For illustrative purposes, the following will be described in terms of a 3G network and a plurality of wi-fi networks providing access to the internet 101, but it will be appreciated that the teachings herein can apply to any one or more wide area wireless networks and any local area wireless networks for providing access to any further packet-based network, preferably a predominantly-wired wide area inter-network.

Still referring to FIG. 1, a plurality of mobile user terminals 102 are arranged to communicate over the networks 101, 103 and/or 106. The user terminals 102 may comprise for example laptop computers, tablets or other mobile terminals such as mobile phones. Each user terminal 102 comprises one or more transceivers for accessing the one or more networks 101, 103, 106.

Each user terminal 102 comprises a short-range wireless transceiver (e.g. wi-fi) for accessing the Internet 101 via the wireless access points 106. In some places, a WLAN may be formed of a single short-range access point 106. In other places, small numbers of access points 106 may be connected together to form a WLAN connecting to the internet 101 through shared local area network equipment. Either way, a mobile terminal 102 connecting to one of the local access points 106 is provided with a route for accessing the internet 101.

Further, each user terminal 102 typically comprises a cellular wireless transceiver 114 for accessing the mobile cellular network 103 via the base stations 104. Access to the Internet 101 may be achieved by means of the base stations 104 of the cellular WWAN 103, e.g. using a mobile packet technology such as GPRS (General Packet Radio Service) or HSPA (High Speed Packet Access). At a higher level of the cellular hierarchy, the cellular network 103 comprises a plurality of cellular controller stations 105 each coupled to a plurality of the base stations 104. The controller stations 105 are coupled to a traditional circuit-switched portion of the mobile cellular network 103 but also to the Internet 101. The controller stations 105 are thus arranged to allow access to packet-based communications via the base stations 104, including access to the Internet 101. The controller stations 105 may be referred to for example as Base Station Controllers (BSCs) in GSM/EDGE terminology, or Radio Network Controllers (RNCs) in USTM or HSPA terminology.

As mentioned, the cellular and short-range wireless transceivers are typically arranged to operate on radio frequencies (RF), with the cellular wireless transceiver 114 typically being arranged to operate on a licensed RF band and the short-range wireless transceiver 115 being arranged to operate on an unlicensed RF band.

An alternative or additional WWAN that may be available in some systems is provided by satellite hub 109 connected to the internet 101. The satellite WWAN may provide yet another route enabling the mobile terminal 102 to access the internet 101 via a satellite transceiver of the mobile terminal 102, typically as a back-up if the other routes via the cellular WWAN or the LLANs fail or are unavailable.

Each user terminal 102 further comprises a memory 110 such as an electronic erasable and programmable memory (EEPROM, or "flash" memory); and a processor 112 coupled to the memory 110, cellular wireless transceiver 114 and short-range wireless transceiver 115. The memory 110 stores communications code arranged to be executed on the processor 112, and configured so as when executed to engage in communications over the Internet 101 and/or cellular network 103. The communications code may comprise signal processing code for transmitting and receiving signals over the wireless cellular network 103 via the cellular wireless transceiver 114 (and/or some or all of this functionality may be implemented in the cellular transceiver 114, though the increasing trend is for at least some of the signal processing to be performed in software). Further, the communications code preferably comprises a communication client application for performing communications such as voice or video calls with other user terminals 102 over the Internet 103, preferably via the short-range wireless transceiver 115 and wireless access points 106; and/or via the cellular wireless transceiver 114, base stations 104 and controller stations 105 of the cellular network 103 as discussed above. However, one or more of the user terminals 102 involved could alternatively communicate via a wired modem, e.g. in the case of a call between a mobile terminal and a desktop PC.

At least some of the user terminals 102 are additionally equipped with a positioning system, coupled to the processor 112. In embodiments this takes the form of a satellite-based positioning system 113 such as a GPS receiver (possibly including of the assisted GPS feature), configured to detect the geographical location of its respective user terminal 102 by reference to a plurality of satellites 107 according to techniques known in the art (usually not the same satellites as provide the back-up internet access via hub 109, though at least some of the components of the satellite transceiver 113 may be shared). In the case of GPS, the system 113 returns a set of geographic coordinates, for example in the form of a pair of latitude and longitude values such as WGS84 (World Geodic System 1984) coordinates of the form (e.g. 51.0000, 0.5200).

In other embodiments, the positioning system could alternatively or additionally comprise a cellular positioning system in the form of cellular positioning code stored on the memory 110 and arranged for execution on the processor 112. In that case, the cellular positioning code is arranged to detect the location of the user terminal 102 by reference to one or more base stations 104. This can be achieved crudely by identifying the location of the base station 104 which is currently serving the user terminal 102, or more accurately by identifying the location of a plurality of nearby base stations 104 and performing a trilateration. In the latter case, the trilateration works by detecting the time for a signal to travel between the user terminal 102 and each of the respective base stations 104. The signal can also travel the other way, from base station to mobile terminal. In another example position can be determined based on signal strength relative to one or more known cells or base stations 104. The detection could be performed by the cellular positioning system 113 running on the user terminal 102 itself, or could be performed by another network element such as controller station 105 and then signaled to the positioning system 113 running on the user terminal 102.

Another option is that the positioning system comprises code configured to detect the position of the respective user terminal 102 by reference to the location of one or more of the WLAN access points 106. This may be achieved by detecting an identifier (ID) of one or more access points 106. Either the ID of the access point 106 could be mapped to a known location of the access point, or the ID itself could be used directly as an indication of geographic location.

In the case of detecting the location by reference to one or more base stations 104 or to a wireless access point 106, the positioning calculation (e.g. the trilateration) may be taken care of on a host terminal of the respective network 103 or 101 (e.g. on a cellular controller station 105 or a server in communication with the wireless access point 106). The positioning system on the user terminal 102 would then comprise a suitable programming interface for retrieving the location information from the host terminal. However, another possibility is for the user terminal 102 performing its own positioning calculation by reference to the one or more base stations 104 or wireless access point 106 is not excluded, e.g. by performing its own cell trilateration.

Other methods also exist. For example, the location of a mobile phone can be calculated by comparing a multipath signal pattern received by a base station with prior known information stored in a database through pattern matching algorithms known as fingerprinting.

Whatever form the positioning system 113 takes, in preferred embodiments it is configured to detect the geographical location of its own respective user terminal 102. That is to say, by means of a measurement or determination process that is at least partially automated, rather than location information simply being entered manually at the respective user terminal 102 for example. However, the option of a manually entered location is not excluded.

Further, the processing apparatus 112 on the mobile terminal 102 will be arranged to perform scanning processes via its local transceiver 115 and cellular transceiver 114, to scan for availability of WLANs and the WWAN respectively. This means the communication client application running on the processing apparatus 112 can be kept aware of what networks are available for internet access, and hence select one of the WLANs or select between a WLAN and WWAN as a means for accessing the internet 101, e.g. for performing a real-time VoIP call with another user terminal 102 over the internet 101. Other examples are to view a website or send an email via a server of the internet 101, or send or receive an IM message or file transfer to or from another user 102. In embodiments the scanning process may be used to enable handover during an ongoing communication, e.g. to handover mid call or during a file transfer.

To assist in the scanning and handover process, there is provided a database of the kind shown by way of example in FIG. 2, 3 or 4.

The database may be stored and maintained in a server 108 connected to one of the networks such as the internet 101, allowing it to be accessed by the mobile terminal 102 via the current transceiver 114 or 115 and corresponding one of the WWAN or WLANs by which it is currently connected to the internet 101. Alternatively the database may be stored and maintained in a memory (e.g. 110) of the mobile terminal 102 itself The database provides a look-up table listing a relevant geographical location against each of a plurality of networks or their individual access points or base stations. In conjunction, the database also lists respective tags providing additional information for use in controlling the scanning and/or handover process. The tags are preferably allocated dynamically by the users themselves, i.e. based on their experience of the networks.

Preferably the database is configured so as to provide a look-up table listing measures of connection quality for the different possible WLANs against corresponding geographical locations relevant to the respective connection quality. Notably, some or all of the measures of connection quality are contributed by the mobile user terminal 102 itself based on its own past experience, or communally by a plurality of user terminals 102, rather than being centrally maintained by a network operator or at least rather than being maintained purely by the operator. The corresponding geographical locations may comprise either the locations of the WLAN access points, or the locations of the mobile terminal 102 at the time of recording its experience.

Note that the term database as used herein does not imply any particular size or amount of data, and nor does the term look-up table imply a graphical table nor any particular structure or layout other than the ability to look-up element against another associated element.

In the example of FIG. 2, each entry in the database comprises: an identifier (ID) of a respective WLAN, an indication of location at which the mobile terminal encountered the respective WLAN, and at least one dynamically allocated "tag" providing additional information relating to the experience of a mobile terminal 102.

Preferably the one or more tags for each entry comprise a measure of connection quality which the mobile terminal 102 experienced when it connected to the WLAN in question. The term quality may be used herein to refer to either fidelity and/or reliability. Fidelity is a measure of a property such as the bandwidth or signal strength available on a particular connection. Reliability is a measure of a property such as how often a connection fails, or the amount of time the connection is available (a connection could be high fidelity when it is available, but not be available very often, or vice versa). Quality may also refer to properties such as latency, loss and/or jitter. In a particularly preferred embodiment, quality is an aggregation of latency, bandwidth, reliability, loss and jitter. Alternatively the quality may comprise any or all of these properties.

The processing apparatus 112 may be provided with a suitable algorithm for making measurements such as peak, average or typical uplink or downlink bandwidth, connection strength, connection up-time or down-time, latency, loss, jitter, or an aggregate measure or any or all of these.

When the client application running on the processing apparatus 112 of the mobile terminal finds itself connected to a particular WLAN or a particular WLAN access point, it instigates a measurement of the connection quality and logs it in the database in association with an indication of the geographical location relevant to that measurement. In a particularly preferred embodiment this may be the geographical location at which the mobile terminal 102 took the measurement, as determined by the positioning system (e.g. GPS transceiver 113) of the mobile terminal 102 itself. The geographic information may comprise coordinates of the experience, e.g. in the form of a latitude and longitude.

In this type of embodiment the client running on the processing apparatus 112 logs the self-determined location in the database along with the quality measurement. This is particularly advantageous as does not require a central operator to maintain the quality measures or the locations in the database, both being contributed instead by the user terminal (or terminals). That is, it is not necessary for an operator or provider to know about access points in advance. Instead it allows users to discover them for themselves.

An alternative is for the geographical location in the database to comprise a predetermined, known location of the access point 106 through which the mobile terminal 102 connected. In this case the geographic locations of the access points 106 may be provided by one or more network operators as predefined elements in the table, against which the client on the mobile terminal 102 logs its measurements. In this case the mobile terminal does not need to submit location measurements as part of the logging process, although it does place a burden on the operator.

Either way, the measurement may be instigated in a number of ways. For example the client application on the mobile terminal 102 may make and log the measurement at the time when it first encounters a new network or first makes a new connection, or at a time of experiencing a peak, average or typical connection quality within a given time window or event (e.g. during a call), or based on a random or periodic timing.

Optionally, the database may also include entries for one or more WWANs, e.g. an entry for each of a plurality of cellular WWAN base stations or cells 104, or an entry for one or more satellite networks. These entries may again be supplemented with dynamically allocated tags, preferably comprising experienced connection quality which may be logged by one or more mobile terminals 102, either recorded against predetermined known locations of the base stations 104 or against the location of the experience as determined by the positioning system of the mobile terminal 102 at the time. The manner of logging the information on the WWAN(s) need not be the same as used in relation to the WLANs, though it may be.

In embodiments, each mobile user terminal may maintain its own personal database on a storage medium (e.g. memory 110) of the mobile terminal 102 itself Alternatively, in an even more advantageous embodiment, a plurality of like client applications running on a plurality of mobile terminals 102 are arranged to contribute to a combined database. The combined database may be stored on a server 108 connected to one of the networks to which the mobile terminals have common access, e.g. the internet 101. Alternatively the combined database could be created by sharing recorded experiences between mobile terminals 102 (e.g. using an ad-hoc or peer-to-peer network), in which case each mobile terminal 102 stores its own instance of the combined database in local storage (e.g. 110).

In the case of a combined database, the amount of data is liable to grow very large, making it unwieldy to search. Even in the case of a personal, local database maintained by one mobile terminal 102 for its own use, the database may nonetheless become cumbersome as many results are logged over time. Therefore there is preferably provided a method of compressing the data into a more manageable form. One way to do this is to detect areas with a high density of entries for a particular WLAN or particular WLAN access point 106, and input these points into an averaging or combining function in order to produce a centroid. This function may be applied by the client application running on the mobile terminal 102 or by a suitable function implemented on the server 108, as appropriate to the embodiment in question. The data could also be trained over multiple iterations, i.e. so that a plurality of already-averaged centroids become the input data to a further averaging function to create a second generation centroid, and so forth.

Note that FIG. 2 does not represent the only way of storing localization data. Some other examples are provided in FIGS. 3 and 4.

In the example of FIG. 3, instead of network IDs each entry is listed by an identification of an individual connection point of the network in question: i.e. either an access point 106 of a WLAN or a specific cell or base station 104 of the WWAN. This is shown schematically in the middle column of FIG. 3. In this case the geographic location associated with each entry need not necessarily be the location of the mobile terminal 102 when it logged its experience (though that is still one option). Instead, the geographic location may be a predetermined location of the connection point (access point or base station), pre-stored in the database by the operator or operators of the network or networks in question. This embodiment may be more suited to a database maintained centrally on a server 108 rather than on individual mobile terminals 102, though it is not excluded that the operator provides information on locations of access points and/or base stations to the mobile terminals 102.

Of course in many cases, where the WLAN comprises only one access point 106, the identification of the WLAN access point 106 may be the same as or equivalent to the ID of the WLAN.

Furthermore, the geographic location need not be defined in terms of the coordinates of a specific point or only in such terms. The geographic information may alternatively or additionally define a region, i.e. an area. This is shown schematically in the left-hand column of FIGS. 3 and 4.

For example, in FIG. 3 optional additional information may be included along with the coordinates of the connection point indicating an extent of the coverage from that point, e.g. an approximate radius to which the coverage extends from the connection point.

In the example of FIG. 4, the geographic information is defined in terms of a region associated with a particular respective network ID. E.g. this information may comprise the name or an indication of a particular town or area, or the coordinates of a set of connection points (WLAN access points or WWAN base stations as appropriate), or a geometric definition of a region such as polygon on the earth's surface (e.g. defined in terms of the vertices of the region).

Once the table begins to be compiled, it can be used by the client application running on the processing apparatus 112 of a mobile terminal 102 to determine whether or when to scan for the availability of alternative access networks (WLAN or WWANs) for accessing the internet 101, with a view to potentially handing over between access networks. For example, the database can be used to determine whether a mobile terminal 102 currently connected to the internet 101 via a WWAN such as a 3G mobile cellular network should scan for availability of a WLAN such as a wi-fi network, so as to potentially handover to the WLAN. Or the database may be used to determine whether a mobile terminal 102 currently connected to the internet 101 via a WLAN should scan for the availability of an alternative WLAN, so as to potentially hand over to the alternative WLAN. As mentioned, this could be used to handover during a VoIP call or other internet communication such as an IM chat session or file transfer.

The client running on the processing apparatus 112 of the mobile terminal 102 is configured to access the database, e.g. from the terminal's own local storage 110, or from server 108 via its current connection to the internet 101. The client running on the mobile terminal 102 then determines its own current geographic location using its positioning module, e.g. GPS 113, and uses its current location to index the database by geographic location. The mobile terminal 102 is thereby able to find the entry most relevant to its current location.

The database may be structured to enable the client on the mobile terminal 102 to narrow down the entries before searching by geographic information. For example, the database may comprise a tree structure, e.g. ordered by country, and then region inside each country, and potentially further subdivisions of region. E.g. the database may comprise a global table of entries, divided into sub tables for each country, then the sub-table for each region may be sub-divided into a further level of sub-table for each smaller region within that region, and so forth as required to achieve a practically searchable level of sub-table. If the client on the mobile terminal 102 has a high-level indication of its region (e.g. knows that it is connected in the UK, or in south west London, or a particular borough in south west London) it can then access the relevant sub-table in the database. However, searching a whole global table is not excluded (though it would be heavy on processing resources).

Within the relevant table or sub-table, the client on the mobile terminal 102 then indexes the remaining entries according to the mobile terminal's own current geographical location. For example it may calculate the distance of the mobile terminal 102 from the geographic location of each entry in the sub-table (e.g. in the examples of FIGS. 2 and 3) and select the most relevant (e.g. closest). Alternatively it may determine the relative location in terms of which geographically defined region or regions the mobile terminal currently falls within (FIG. 4).

In one embodiment, the client on the mobile terminal 102 indexes the table or sub-table according to distance or relative geographic location, and for those within suitable range determines the associated measure of connection quality found in the look-up table provided by the database. The client running on the processing apparatus 112 of the mobile terminal 102 thus determines the best result, i.e. best quality within range according to the table.

An alternative is for locations in the table to be quantized according to a structured, cell-like grid, as will be discussed later in relation to FIGS. 5 and 6. In this case the client looks up the available network(s) in the current unit area of the grid in which the mobile terminal currently finds itself The client application on the mobile terminal 102 may be configured to perform the table look-up to assess network availability on a periodic or random basis, or in response to being to a certain event such as detecting that current connection quality has fallen below a certain threshold. In another alternative, the results could be looked-up and provided to the mobile terminal 102 by a network element such as the sever 108, via the access point or base station through which the mobile terminal 102 is currently connected to the internet 101.

Once the table is accessed and indexed to find the most appropriate entry, this result may then be used by the client on the mobile terminal 102 to decide whether it is worth powering up its transceiver(s) to perform a scan for other available potentially networks (other than the one it is currently connected to). This may comprise deciding whether to initiate a handover process. In embodiments of the present invention, initiating a handover process comprises at least as an initial stage performing a scan (as opposed to conventional systems which perform a periodic scan). On condition that the scan detects empirically that the network expected based on the table look-up is indeed available, the mobile terminal 102 then hands over.

So if the best entry as determined according to the table look-up corresponds to a different network than that which the mobile 102 is currently using to connect to the internet 101, the client application initiates a handover by first performing a scan to test whether the new network is actually present, and then if so handing over to that network. For example if the mobile terminal is currently connected to the internet 101 by a WWAN such as a 3G cellular network, but the best entry found in the table based on relative location and connection quality corresponds to a particular WLAN such as a wi-fi network, then the mobile terminal 102 is configured to use the ID of that WLAN as indicated in the relevant table entry to initiate a handover process. This starts with at least a scan to test whether the expected WLAN is really available, and if so continues to complete the handover. If it turns out the WLAN is not in fact available on the other hand (e.g. because it is experiencing a temporary problem or the table is out of date) then handover may be aborted, or the second best entry could be tried.

Similarly, if the mobile terminal is currently connected to the internet 101 by a WLAN such as wi-fi network, but the best entry found in the table based on relative location and connection quality corresponds to a different WLAN such as another wi-fi network, then the mobile terminal 102 is configured to use the ID of the new WLAN as indicated in the relevant table entry to initiate a handover process. This starts with at least a scan to test whether the expected new WLAN is really available, and if so continues to complete the handover. If it turns out the new WLAN is not in fact available on the other hand then handover is aborted, or the second best entry could be tried.

In alternative embodiments, the mobile terminal 102 may be configured to perform a periodic scan, and the results from the table look-up may be used to adapt the frequency of scanning or to inhibit the periodic scan. For example, if it is determined that there are no likely better candidates at the mobile terminal's current location, the scan may be performed at lower rate or regularity (fewer scans per unit time); but if it is determined that likely better candidates do appear to be available based on the table-took up, it increases the scans to a high rate or regularity (more scans per unit time). In another example, the mobile terminal may be configured to perform scans periodically, but to cancel one or more of the scheduled scans if it is determined based on the table look up that no better candidates are likely to be available at the mobile terminal's current location.

Instead of searching the table for the best quality network from amongst a plurality within suitable range, a variant of this is to index the table by location to find the closest network to the mobile terminal, then check whether that closest network promises a better connection quality than the current network according to the associated tag in the look-up table.

Note that the table does not necessarily comprise entries for all types of network. E.g. in one preferred embodiment the table only comprises entries for WLANs or WLAN access points 106, but not WWANs or WWAN base stations or cells (e.g. not for 3G mobile networks or satellite back-up networks). In this case one or more WWANs may be assumed always to be present. In embodiments, the decision whether to scan and attempt handover from a WWAN to a WLAN may be based on whether the best WLAN entry found in the table passes a certain threshold or other criterion—for example if the metric is below a certain threshold if the metric increases with distance and decreases with quality, or above a certain threshold if the metric decreases with distance and increases with quality. If the threshold or criterion is not met, the mobile terminal 102 may connect to the internet 101 via a particular WWAN by default, e.g. via a cell 104 and control station 105 of the 3G cellular network 103.

Quality measurements are not the only kind of additional information with which entries in the table may be tagged.

Other information with which entries may be tagged includes motion information, which information may comprise an indication of whether the connection point of a network is stationary or moving, and/or a measure of speed or velocity of the connection points. This is particularly suited to a situation in which each entry of the table comprises an element identifying an individual connection point and/or a particular WLAN. For example, nowadays WLANs are increasingly found on public transport such as trains, busses, planes and boats, or even in private cars.

The motion of the WLAN may be relevant to the decision as to whether it is worth spending battery power scanning, and whether it would be desirable to handover. For example, a WLAN on a passing train will not be very useful to a user who is relatively stationary. On the other hand, a user on the train is likely to want mainly to use the train's WLAN, and other passing WLANs that are relatively stationary on the ground will be not tend to be useful.

The motion information for each of a plurality of the entries in the table may comprise an indication as to whether or not the access point or WLAN is moving. Alternatively or additionally, the motion information for each of a plurality of the entries in the table may comprise an indication of speed (magnitude only) or velocity (magnitude and direction), or indeed just direction. Direction may matter, e.g. a mobile terminal 102 moving at a similar speed as a WLAN and in approximately the same direction may have reason to connect to it, but a mobile terminal 102 moving at similar speed but substantially opposite direction to a particular WLAN would probably not want to connect to that WLAN.

In particularly preferred embodiments, the motion information is captured and tagged dynamically by one or more individual mobile terminals 102 based on their own experience, in an analogous manner as described in relation to the quality information.

In this case, instead of measuring connection quality, the client application on the mobile terminal 102 determines an indication of motion as and when it encounters a given network. For example, the motion measurement could be determined by detecting how quickly the access points or cells or base stations pass by relative to the mobile terminal 102, and/or Doppler estimates based on signals from access points or cells or base stations may be used. Information from one or more accelerometers (not shown) and/or GPS on the mobile terminal 102 may also be taken into account (so that the mobile 102 knows it is not itself the one moving, if so how much of the relative motion is due to itself). In embodiments, multiple such factors can be taken into account to give an estimation of the motion of the WLAN or its individual access points 106. The measurements may be instigated and logged in any of the same ways discussed in relation to the quality information.

However, another option is for some or all of the motion information to be maintained in a predetermined fashion by one or more operators, and/or entered manually by a user based on experience.

In some embodiments the motion information may be taken into account in a combined metric, combining quality and motion information.

$$\text{Metric} = \text{function}\{\text{quality}, \text{relative motion}\}$$

The table can then be used to find a best (most relevant) entry for the mobile terminal according to this combined metric at its current location, in a similar manner to that described above but with the metric also taking into the mobile's own state of motion relative to the entries in the table, e.g. whether the mobile terminal 102 itself is moving or not and/or its own speed or velocity). The particular form of the metric is free for the system designer to tune according to particular requirements, e.g. based on simulations of the particular communication system in which it is to be applied.

Alternatively, instead of searching the table for the best entry within range according to the combined metric, the client on the mobile terminal 102 may look-up the closest access network that is not ruled out by a particular rule, such as that all moving WLANs are to be ignored unless moving in the same direction as the mobile terminal 102 (within some allowed margin).

Once the desired entry is found, the client running on the mobile terminal 102 determines whether this corresponds to a different access network than the mobile is currently using to connect to the internet 101, and if so control scanning and potentially handover. Again, the process may proceed in the same manner described in relation to the scanning and handover based on the quality tags.

In embodiments, the table may contain both motion information and geographical location. Either or both of these may be tagged dynamically by a mobile terminal as and when it experiences the network. Of course if an access point is moving, e.g. because it's installed on a train, it may not have a well-defined location. There are a number of ways to combine both motion information and geographic information into the same table for use in predicting network availability.

On way is for stationary networks or access points to be tagged with a static geographic location, and for moving networks or access points to be tagged with motion information indicative of motion instead of the geographic location. These different kinds of information may be included for different entries in the same table. I.e. each entry comprises one bur not both of: a geographic location (and optionally motion information in the form of a flag indicating that the network or access point is stationary), or motion information indicative of motion (either in the form of a flag indication motion and/or an indication of the speed, direction or velocity of the network or its access point(s)).

For example, the server 108 may be configured to recognize when it has received a lot of contradictory localization observations. From that, the server may tag the network as "moving"—so it yields dynamic "movement" tagging. That also means that the observation of that access point is not useful for positioning. The relevancy of a moving access point depends on the mobile terminal moving itself In a more advanced implementation, the system may exploit knowledge that the mobile terminal's position is somewhere on a line or route over which the access point has been observed. For example, the database may be configured to map the multiple observed positions of the access point along a regular route like a train line. The client on the mobile terminal 102 may then be configured to determine that when it is found at a geographic location along the train line or other such regular route, then there is a possibility of the access point or network being available. In this embodiment, a given entry in the table may include both geographic location information and motion information.

Another way is to tag the access as being available at a particular location at a particular time of day, e.g. based on train time tables or real-time updates available from railway operators. See also discussion later on including time of day in the look-up table.

Further, according to particularly advantageous embodiment of the present invention, each of a plurality of entries in the database is also tagged with price information. This information may comprise a quantitative indication of the actual cost of connecting to the internet 101 through a particular access network, or just an indication of whether the network or access point is free or not. For example, some WLANs are free whilst some others incur a cost, e.g. a cost per unit time. The cost of different WLANs may also be different. Alternatively or additionally, the table could include the cost of one or more WWANs, e.g. 3G cellular network and/or satellite back-up network.

In one particularly preferred embodiment, the price information is tagged dynamically by users themselves, in a similar manner as described in relation to the quality information and motion information, i.e. based on their actual experience when encountering networks rather than the price database being centrally administered by one or more operators. The information could be logged automatically by the client application, or manually instigated by the user. This advantageously enables users to rate providers in a "virtual marketplace".

As an extension to the globally tagged access points, the client running on the mobile terminal 102 may present the user with his current connection options including quality indicators, along with pricing information to help him select an appropriate one. Alternatively, the client application may make the decision for the user based on the pricing information and what he or she is doing at the time (e.g. audio or video call), using a selection policy which can be either a default one or one defined or selected by the user.

The table is initially indexed according to geographic location. Instead of just automatically selecting the best entry based on quality and/or motion and performing a scan in dependence on that entry, the client application on the mobile terminal 102 may be configured to generate a short-list from amongst a plurality of best entries according to the geographical locations, quality information or combined metric. The client then displays the short-list to the user, with price listed against network. Preferably the short-list also displays other tagged information such as the connection quality and or motion information alongside the identity of the networks. The user is then able to select one of the access networks, e.g. to select between WWAN and WLAN and/or select between multiple available WLANs.

For example the user wishes to perform a non real-time communication such as a file transfer and is not in a hurry, he or she may choose a cheaper but worse quality network, e.g. a free WLAN that is slow because it is shared between many users. On the other hand if the user wishes to perform a real-time or urgent communication such as a VoIP call, he or she may choose a more expensive but faster or more reliable network such as a paid WLAN or a WWAN.

Alternatively the client application may not necessarily display the short-list to the user, but may be configured to automatically select one of the access networks from the short-list according to the automatic selection policy (e.g. select the best quality candidate for real-time calls and the cheapest candidate for non real-time communications).

Thus the user is presented with a list of available networks along with their quality as experienced by other users, or alternatively, a network is selected for the user based on pricing information, quality, and user needs/activity.

In another alternative, the price information may be taken into account in a combined metric, e.g. as a function of {quality, motion, price}, and the client application running on the mobile terminal 102 may use this metric to automatically select the best entry from amongst those within suitable range based on the indexed localization. For example if the best entry does not correspond to the current network (e.g. the table look-up indicates there is a better WLAN available when price is weighed against connection quality), then the client application may trigger a scan and potentially a handover in the same manner discussed above in relation to the quality and motion information.

Other information listed could include time of day. For example, certain networks may be more or less likely to be available at certain times of day.

The information on time of day may be logged in any of the same ways discussed in relation to the quality tags, e.g. dynamically by the mobile terminal 102. In embodiments, the time-of-day may be used as an extra table index, i.e. the table may be indexed based not only on geographic location, but also based on time of day. So the searching of the table does not just comprise checking a certain network at a certain location, but also checking a certain network at a certain time of day. For example, some networks may be fine mid-day, but horrible in rush hour. E.g. this may be the case with the 3G network in the business centre of a busy city due to commuters with smartphones.

A method using a database of a kind exemplified in relation to FIG. 2, 3 or 4 may proceed as follows.
(i) Obtain the position of the mobile terminal (MT) by GPS, base station trilateration, or WWAN/WLAN ID (using WWAN and/or WLAN ID requires the server knows the relevant positions). If the user terminal knows the position by GPS, it may send coordinates to the server along with WLAN/WWAN ID so the server can add the ID to its table.
(ii) Poll a server (or a locally maintained or shared distributed database) for list of nearby networks (according to some suitable proximity criterion), and look up the associated tags such as quality, motion and/or price information.

(iii) If multiple tags are taken into account, e.g. quality and motion, compute a score for each network determined to be nearby according to the table. For example, score=f(quality, motion).
(iv) If there is a better network, scan for it.
(v) Handover to network with best score.
(vi) After use, send the experienced quality to server so it can update its quality for the network. The database is thereby dynamically maintained. Alternatively or additionally the table could be dynamically updated on other occasions, e.g. periodically or upon a certain event such as entering a new network for the first time.

An alternative method using an alternative kind of database is now discussed in relation to FIGS. 5, 6 and 7.

Referring to FIG. 5, in this alternative method a geographical region such as a country or region of the globe is considered to be divided and sub-divided into areas and sub-areas, preferably into multiple hierarchical levels of sub-area. As shown in the left-hand columns of FIG. 6, each of a plurality of entries in the table then corresponds to a respective unit of geographical area, a unit being the smallest level of sub-area, i.e. smallest sub-division. Thus the region is divided into a cell-like grid (not necessarily square or rectangular), but each "cell" corresponds to a geographical sub-division on the map, rather than the area covered by a particular access point or base station.

The database then provides a look-up table (maintained on a server 108 or on the mobile terminal 102 itself) which maps against each cell-like geographic unit a list of any networks that have been found to be available in that unit (i.e. sub-area). This is shown schematically in the middle column of FIG. 6.

In addition, the table stores the associated tags (quality, motion and/or cost information) for each of the networks. In FIG. 6 the tags are mapped against each occurrence of each network in each unit. Duplicate entries can be avoided by averaging quality tags for the {location, network} tuples Preferably the tags are again logged dynamically by the mobile terminal 102 or a plurality of such mobile terminals as and when they encounter the relevant experience, along with in identification of the geographical unit in which they encountered that experience.

The mobile terminal 102 can thus access and index the table by location, to determine the identities of nearby networks and associated information such as quality, motion and/or cost. The different levels of division and sub-division make the table more efficient for the mobile terminal to search. Such a method may proceed as follows.
(i) Obtain position of Mobile Terminal (MT) by GPS, base station trilateration, or WWAN/WLAN ID. For WWAN/WLAN positioning, the server keeps a table indexed WWAN/WLAN ID containing an estimate of their position. If the user terminal knows its position by GPS, this is sent to server along with WWAN/WLAN ID. The server uses this to update its WWAN/WLAN position estimate.
(ii) The server holds a table indexed by geographical positions that is a cell-like, world-spanning grid. Cells are preferably smaller than WWAN cells. The table may be huge, but well-structured so easy to search.
(iii) Server keeps a list of networks known within each cell.
(iv) For each network in a cell, keep track of experienced quality.
(v) The mobile terminal scans for a better network if the server table indicates a better one should be available.
(vi) The mobile terminal hands over if better network is available.
(vii) After use, the mobile terminal sends its experience to server to update its quality of network in given position.

The cell-like structure provides an alternative way of the mobile terminal 102 logging its position. Instead of the actual coordinates at which the mobile terminal encountered the logged experience (quality, motion or price information), or an average centroid based on multiple mobile terminals experiences; an identification of the geographical unit corresponding to the sub-area in which the mobile terminal 102 encountered the experience can be logged.

Either way, an advantage of the mobile terminal logging its position is that the server does not need a priori knowledge about WWAN and/or WLAN positions, but can update these dynamically too. A potential disadvantage is that distance to the access point may not be taken into account explicitly without such knowledge. A way to mitigate this is in step (vi) is to take into account signal strength when deciding which network is better (signal strength is known after scan).

It will be appreciated that the above embodiments have been described only by way of example.

In embodiments the database may be stored at a server and populated by measurements from a plurality of user terminals including said mobile terminal Alternatively the database may be stored at said mobile terminal and populated by said mobile terminal In further embodiments the database may be stored at a server and the motion information is predetermined by one or more network operators.

The positioning module may be arranged to determine the location of the mobile terminal using one or more of: GPS, identification of one or more access points of the wireless local area networks, an identification of one or more cells of a wireless wide area network, a trilateration between ones of said access points and/or base stations, a measure of signal strength relative to one or more of said access points and/or base stations, and a comparison of a multipath signal pattern received by a base station with prior known information, or others.

The geographical locations in said database may be contributed by one or more mobile terminals including at least said mobile terminal. The geographical locations in said database may be predetermined by one or more network operators.

In further embodiments, the motion of the mobile terminal may be determined using one of: the positioning module, and one or more accelerometers of the mobile terminal, or others.

The wireless local area networks may comprise at least one of a wi-fi network, a HiperLAN network, a HomeRF network, an OpenAir network and a Bluetooth network, or others.

The one or more wireless wide area networks may comprise one or more of an LTE, W-CDMA, GSM, UMTS, UTRAN, HSPA, CDMA2000 or other 3GPP network, a WiMAX network, a CDPD network and a Mobitex network, or others. Alternatively or additionally, the one or more wireless wide area networks comprise a satellite network.

The first network may be the internet.

Other variants may become apparent to a person skilled in the art given the disclosure herein. The scope of the invention is not limited by the described examples but only by the accompanying claims.

The invention claimed is:

1. A mobile terminal for use in a communication system comprising a first packet-based network and a plurality of wireless access networks providing access to the first packet-based network, the mobile terminal comprising:
one or more transceivers for connecting to the wireless access networks; and
a positioning device configured to determine a geographical location of the mobile terminal;
a processing apparatus coupled to the one or more transceivers and the positioning device, and operable to communicate with the first network by forming connections with the access networks using the one or more transceivers, the processing apparatus configured to:
access, via at least one of the plurality of wireless access networks, a database recording motion information relating to motion of connection points of the wireless access networks and geographical location information relating to the wireless access networks, the motion information comprising at least one of whether the connection points are moving, a speed at which the connections points are moving, or a direction in which the connection points are moving;
determine second motion information for a connection point;
write the second motion information to the database via the at least one of the plurality of access networks; and
determine one of the wireless access networks for use in accessing the first network based at least in part on the motion information and the geographical location information accessed from said database relating to one or more of the wireless access networks.

2. The mobile terminal of claim 1, wherein the motion information in said database comprises indications of whether connection points are stationary or not and are contributed by a plurality of additional mobile terminals.

3. The mobile terminal of claim 1, wherein the database records the motion information and the geographical location information for one or more of the access networks in association with times of day relevant to the availability of the respective access networks, and the processing apparatus of the mobile terminal is configured to determine one of the access networks for use in accessing the first network in dependence on the motion information, the geographical location information, and the associated time of day.

4. The mobile terminal of claim 1, wherein the processing apparatus is configured to determine motion information relating to a connection point as experienced by the mobile terminal, and to thereby record the determined motion information in the database.

5. The mobile terminal of claim 1, wherein the processing apparatus is configured to record a geographical position of the mobile terminal as determined by said positioning device as the geographical location information relating to one of said access networks.

6. The mobile terminal of claim 1, wherein, if the mobile terminal is moving, the processing apparatus is configured to determine the one of the wireless access networks for use in accessing the first network based on the connection points moving in a similar direction and speed as the mobile terminal.

7. The mobile terminal of claim 1, wherein the access networks comprise a plurality of wireless local area networks, and the one or more transceivers comprise a local transceiver for connecting to the wireless local area networks, the processing apparatus being coupled to the local transceiver and operable to communicate with the first network by forming connections with the wireless local area networks using the local transceiver.

8. The mobile terminal of claim 1, wherein the database comprises additional information relating to a price of one or more of the access networks, and wherein the processing apparatus is further configured to determine one of the wireless access networks for use in accessing the first network in dependence on the price of one or more of the access networks as accessed from said database.

9. A computer-implemented method comprising:
communicating between one or more transceivers of a mobile terminal and a network by forming connections with wireless access networks;
accessing, by a mobile terminal, via at least one of the plurality of wireless access networks, a database recording at least one of motion information relating to motion of connection points of the wireless access networks and geographical location information relating to the connection points of the wireless access networks, at least one of the motion information or the geographical location information in the database including information that is determined by one or more individual mobile terminals;
determining, by the mobile terminal, second motion information for a connection point;
writing, by the mobile terminal, the second motion information to the database via the at least one of the plurality of access networks; and
determining, by the mobile terminal, one of the wireless access networks for use by the mobile terminal in accessing the network based on the motion information and the geographical location information accessed from said database relating to one or more of the wireless access networks.

10. The computer-implemented method of claim 9, wherein the motion information comprises at least one of whether the connection points are moving, a speed at which the connections points are moving, or a direction in which the connection points are moving.

11. The computer-implemented method of claim 9, wherein the motion information in said database comprises indications of whether connection points are stationary or not and are contributed by a plurality of additional mobile terminals.

12. The computer-implemented method of claim 9, wherein the database records the motion information and the geographical location information for one or more of the wireless access networks in association with times of day relevant to the availability of the respective access networks, and the processing apparatus of the mobile terminal is configured to determine one of the wireless access networks for use in accessing the first network in dependence on the motion information, the geographical location information, and the associated time of day.

13. The computer-implemented method of claim 9, wherein a processing apparatus of the mobile terminal is configured to record a geographical position of the mobile terminal.

14. The computer-implemented method of claim 9, wherein a processing apparatus of the mobile terminal is configured to determine motion information relating to a connection point as experienced by the mobile terminal, and to thereby record the determined motion information in the database.

15. The computer-implemented method of claim 9, wherein if the mobile terminal is moving, the determining comprises determining one of the wireless access networks for use in accessing the network based on the connection points moving in a similar direction and speed as the mobile terminal.

16. The computer-implemented method of claim 9, wherein the database comprises additional information relating to a price of one or more of the access networks, and wherein the determining the one of the wireless access networks for use in accessing the first network is based at least in part on the price of one or more of the access networks as accessed from said database.

17. The computer-implemented method of claim 9, wherein the database records the motion information relating to motion of connection points of the wireless access networks.

18. The computer-implemented method of claim 9, wherein the database records geographical location information relating to the connection points of the wireless access networks.

19. The computer-implemented method of claim 9, wherein the database records both the motion information relating to motion of connection points of the wireless access networks and the geographical location information relating to the connection points of the wireless access networks.

* * * * *